United States Patent [19]

Einarsson

[11] Patent Number: 4,538,327

[45] Date of Patent: Sep. 3, 1985

[54] SEPARATING AND CLEANING DEVICE FOR SHELLFISH

[75] Inventor: Gudbjartur Einarsson, Hafnarfjord, Iceland

[73] Assignee: Veltak H/F, Hafnarfirdi, Iceland

[21] Appl. No.: 475,108

[22] Filed: Mar. 14, 1983

[30] Foreign Application Priority Data

Mar. 18, 1982 [IS] Iceland ........................................ 2711

[51] Int. Cl.³ .............................................. A22C 29/00
[52] U.S. Cl. ........................................... 17/53; 17/65; 17/74; 209/290
[58] Field of Search .................... 17/51, 74, 48, 65, 64; 209/290, 289

[56] References Cited

U.S. PATENT DOCUMENTS

| 1,305,223 | 5/1919 | Kinread | 209/290 X |
| 1,620,953 | 3/1927 | Davis et al. | 17/64 |
| 2,161,032 | 6/1939 | Formway | 17/74 X |
| 3,238,560 | 3/1966 | Jurisich | 17/51 X |
| 3,988,805 | 11/1976 | Martin et al. | 17/48 |

Primary Examiner—Willie G. Abercrombie
Attorney, Agent, or Firm—Frishauf, Holtz, Goodman & Woodward

[57] ABSTRACT

A machine for cleaning and sorting shellfish into a predetermined range includes an inner drum connected to a central shaft and formed with a plurality of relatively large openings dimensioned to allow shellfish falling within the predetermined range to pass therethrough. The contents of a plow or dredge are fed into an inlet end of this inner drum and the contents which are larger than the desired range of sizes for the shellfish are retained within the drum. An outer drum is spaced in surrounding relation about the inner drum has a plurality of smaller openings sized to retain shellfish within the predetermined range. These smaller openings include circular openings allowing shellfish smaller than the predetermined range to fall from the outer drum, and longitudinal openings located downstream from the circular openings for allowing half shells from the shellfish within the predetermined range to fall from the drum.

12 Claims, 4 Drawing Figures

SEPARATING AND CLEANING DEVICE FOR SHELLFISH

BACKGROUND OF THE INVENTION

The present invention relates to a machine for automatically selecting shellfish within a particular range of sizes from the catch brought on board a commercial fishing vessel or the like, and for washing the graded shellfish.

In the commerical catching of shellfish, such as scallops and the like, a special trawl is typically dragged along the bottom of the sea by a fishing boat. The trawl, often called "plow," scrapes up shellfish and other marine animals lying at the sea bottom, along with stones, gravel and other waste. On board the vessel, the shellfish must be separated from the waste, graded and sorted, and preferably also cleaned in preparation for further processing. This grading and cleaning is often very hard work and typically takes a long period of time.

Various machines have been proposed for grading and washing shellfish. Such machines, however, are typically rather complicated and require large amounts of room. Space is, of course, at a premium aboard ship. It is thus desirable to provide a compact machine operable automatically to grade and clean shellfish.

SUMMARY OF THE INVENTION

An object of the present invention is to provide a relatively compact cleaning and grading machine which enables the grading and cleaning of shellfish to be performed easily and quickly on board the fishing vessel. According to the present invention, this object is accomplished by sending the contents of the plow through a separating and cleaning machine which automatically selects shellfish of a particular range of sizes from the contents of the plow, and simultaneously cleans the selected shellfish.

A machine according to the present invention includes an inner drum connected to a central shaft and formed with a plurality of relatively large openings dimensioned to allow shellfish falling within a predetermined range to pass through these openings. The contents of the plow are fed into an inlet end of this inner drum, and the contents of the plow which are larger than the desired range of sizes for the shellfish are retained within the inner drum.

An outer drum is spaced in surrounding relation about the inner drum and has a plurality of smaller openings sized to retain shellfish falling within the predetermined range within the drum. These smaller openings include circular openings allowing shellfish smaller than the predetermined range to fall from said outer drum, and longitudinal openings located downstream from the circular openings for allowing half shells from shellfish within the predetermined range to fall from the drum.

The drums are rotated through a common central shaft and, preferably, this central shaft is made hollow and receives pressurized water which exits through apertures in the shaft to simultaneously spray the contents of the drum with a washing liquid as the shellfish are sorted.

These and other important features and advantages of the present invention will become more apparent from the following detailed description of a preferred embodiment of the present invention taken in conjunction with the attached drawings, in which.

DETAILED DESCRIPTION

Figure 4:
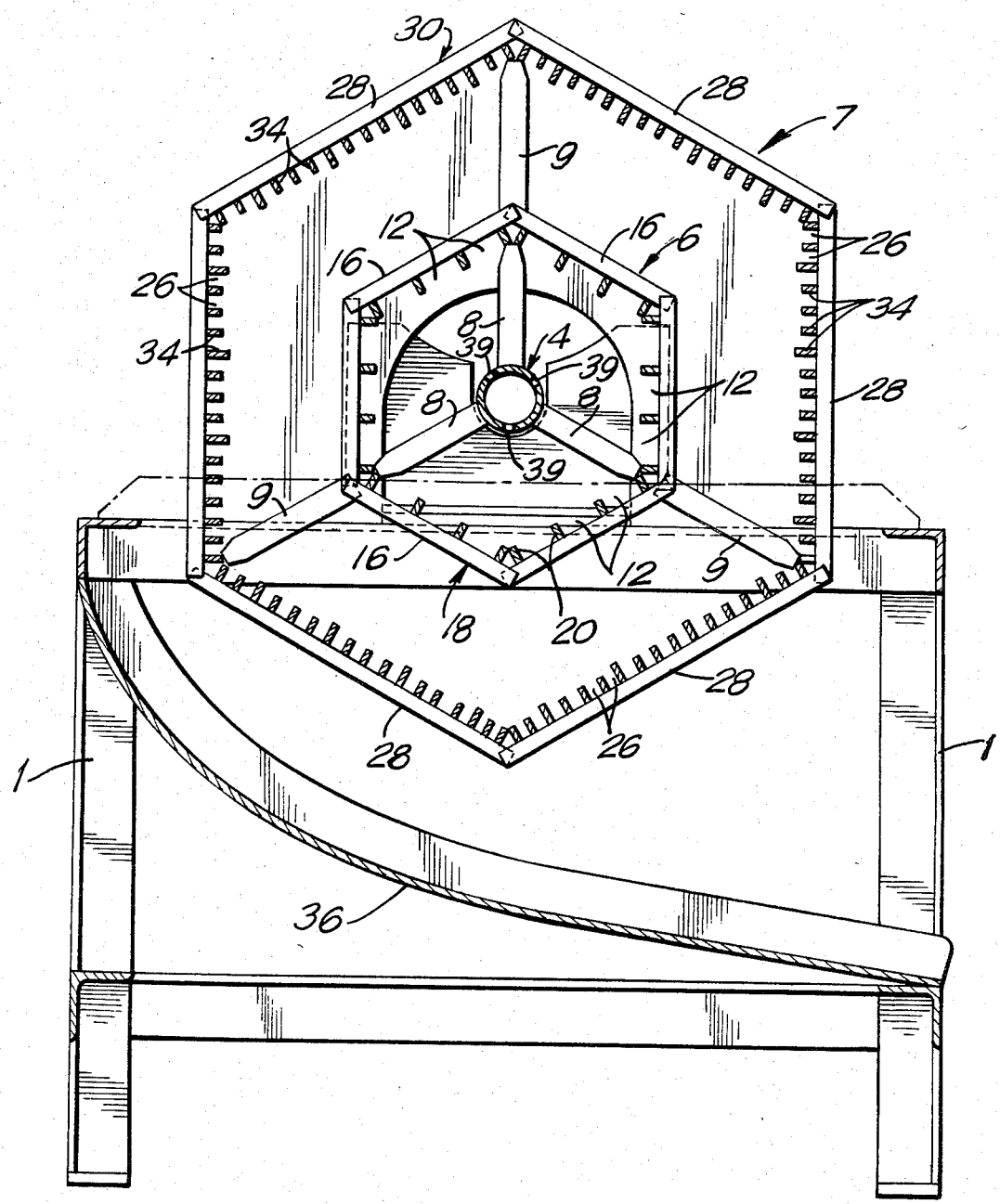
FIG. 4 is a section taken through line 4—4 of FIG. 3.

Referring to the figures, the machine of the present invention includes a supporting frame 1 carrying a drive motor 2 at one end and having a bearing unit at the other end 3. Between the driving motor and the bearing unit there is provided a tubular shaft 4 supporting an inner drum 6 through strut members 8. The shaft 4 runs centrally through the drum 6 and also supports an outer drum 7 spaced in surrounding relation about the inner drum 6. As illustrated in FIG. 4, the outer drum 7 is supported concentrically about the inner drum 6 by strut members 9. Shaft 4 is supported at its respective ends by the motor 2 and bearing unit, and is rotatably driven by the motor to rotate the drums 6 and 7. The catch brought up from the plow is conveyed by a intake chute 10 into inlet end 11 of the inner drum 6, and moves toward the other end of the drum adjacent the driving motor 2. The inner drum 6 is longer than the outer drum 7 and is formed with a plurality of relatively large openings 12 each dimensioned to allow shellfish within the desired range to pass therethrough, but retaining larger waste. At the end of the inner drum 6 there is a special slide 14 leading the waste retained in the inner drum 6 overboard.

Figure 1:
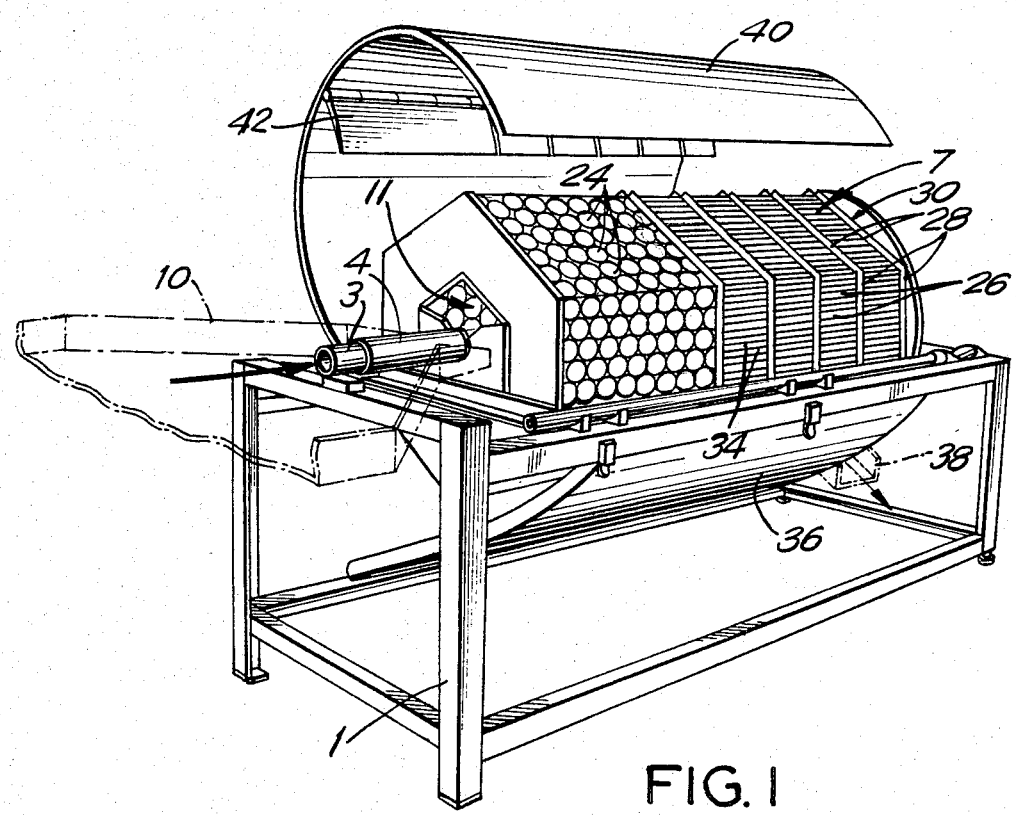
FIG. 1 is a perspective view illustrating a machine according to the present invention.
Figure 2:
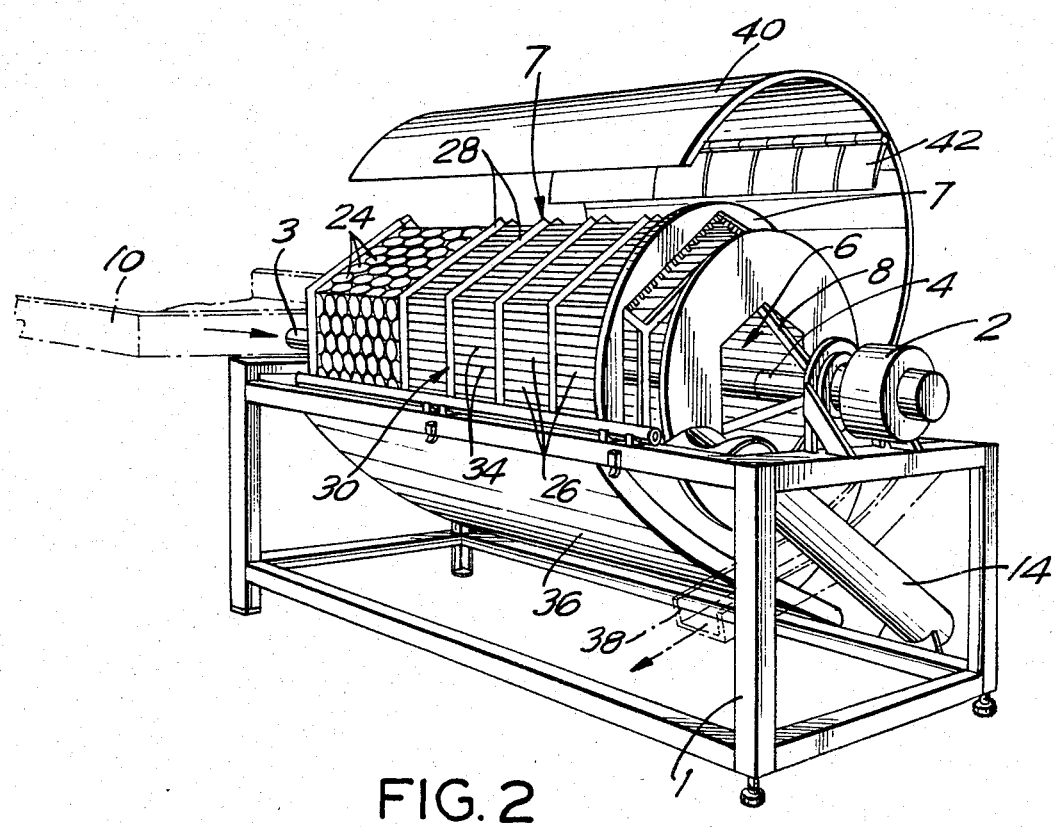
FIG. 2 is a perspective view similar to FIG. 1, but showing the other end of the machine.
Figure 3:
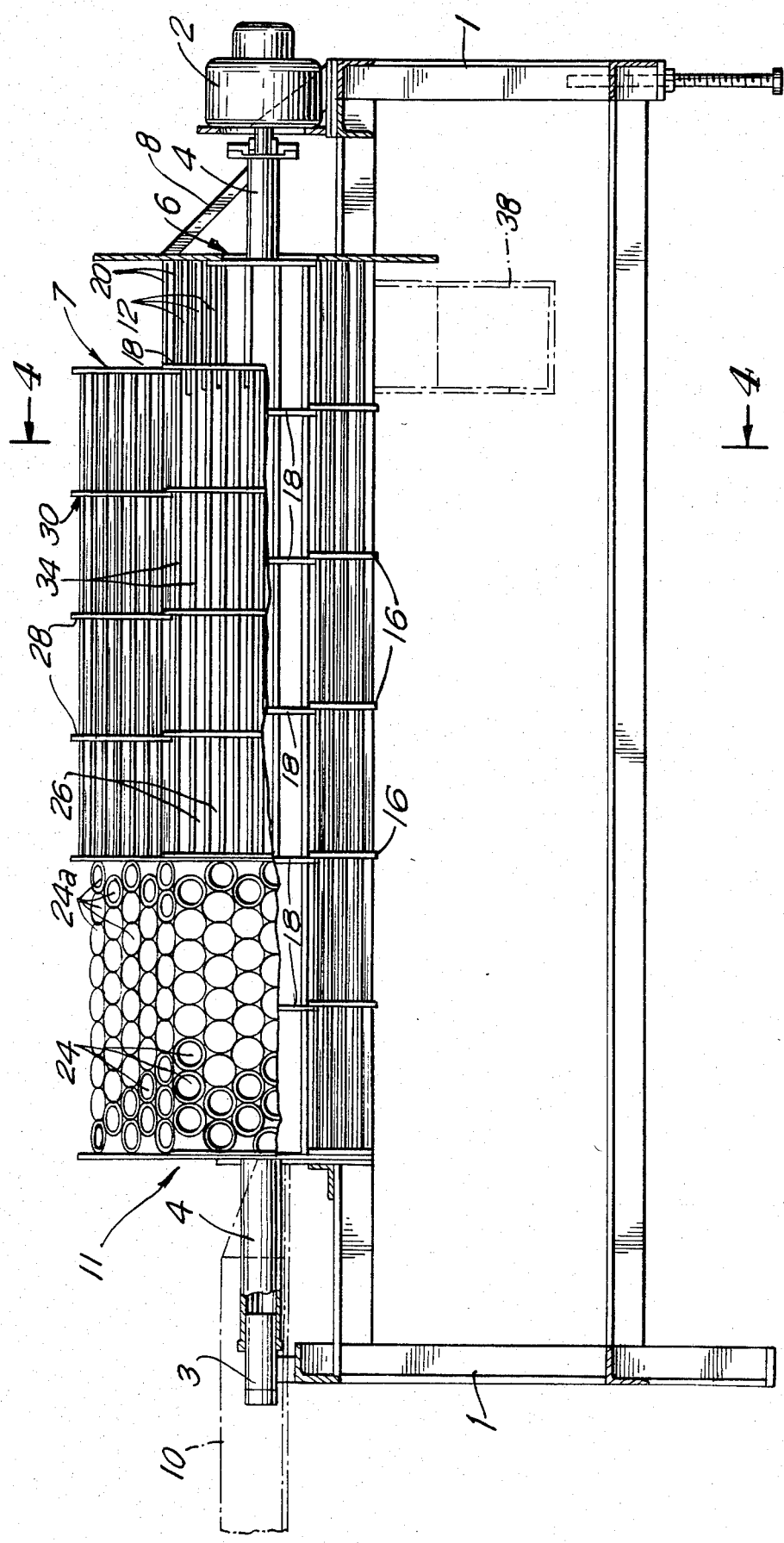
FIG. 3 is a plan, schematic view of the machine of FIG. 1.

As shown in FIGS. 3 and 4, the inner drum 6 is polygonal in section and is formed by support elements 16 secured and to end to form polygonal rings 18 spaced in parallel relation along the inner drum. Connected to these rings 18 are bars 20 extending longitudinally but spaced circumferently to provide the openings 12. These bars protrude inwardly of the inner drum to agitate the contents thereof during rotation. Due to the polygonal section of the drum and the inwardly protruding bars 20, the contents of the inner drum are tumbled rather thoroughly as the inner drum 6 is rotated.

The outer drum 7 has a plurality of openings smaller than the openings 12 of the inner drum 6. These smaller openings of the outer drum are dimensioned to retain shellfish within the desired range, but allow smaller shellfish and waste to pass therethrough.

The smaller openings of the outer drum 7 are formed by two kinds of openings, and as shown clearly in FIG. 3, include circular openings 24 and longitudinal openings 26 located downstream of the circular openings 24. The smaller openings 24 are sized to retain shellfish within the desired range, and allow smaller shellfish and waste to fall from the outer drum. However, some forms of waste material, such as half shells from shellfish within the desired range, may not pass through the circular openings 22. Such waste will, however, pass through the longitudinal openings 24.

The outer drum 7 is also polygonal in section and, similarly to the inner drum 6, is formed by support elements 28 secured into parallel spaced rings 30. The circular openings 24 are formed by a network of ring elements 24a secured together between rings 30. The longitudinal openings 26 are formed in a manner similar to the openings 12 of the inner drum, i.e. they are formed by longitudinal bars 34 spaced circumferently. These bars 34 also protrude inwardly of the other drum circumference to agitate the contents thereof during rotation, and as noted in FIG. 4, the bars vary in depth, to ensure the mentioned agitation and prevent the contents of the drum from sliding down the sides of it.

Provided beneath the entire length of the outer drum 7 is a slide 36 which receives the waste from the outer drum and conveys it overboard. Adjacent the outlet end of the outer drum 7 there is provided another slide 38 receiving the shellfish exiting the outer drum. This slide 38 leads to a conveyor which may feed the shellfish for further processing.

As the contents of the drums are agitated during rotation, they are washed by a spray of water. In a preferred form of the present invention, the water enters the tubular shaft 4 adjacent the end 3 under pressure and exits through space apertures 39 formed in the tubular shaft 4. In this way, the contents of the inner drum are thoroughly sprayed by wash water which flows onto the contents of the outer drum.

A protective shield 40 is pivoted at one end and is adapted to fit over the two drums. This protective shield includes a longitudinal rubber flap 42 connected to the inside of the protective shield and is adapted to extend between the openings in the outer drum for loosening any materials which may become wedged between these openings.

While the present invention has been described and illustrated with reference to a particular embodiment thereof, it will be apparent that the new features herein set forth may also be employed in other forms while still utilizing the substance of the present invention which is intended to be defined by the following claims.

I claim:

1. A separating and cleaning machine for selecting shellfish within a predetermined range of sizes, comprising:
   an inner rotatable drum connected to a central rotary shaft and formed with a plurality of relatively large openings dimensioned to allow shellfish within said predetermined range to pass therethrough, said inner drum having an inlet end leading to the interior thereof;
   means for feeding a catch brought on board a vessel into said inlet end of said inner drum;
   an outer rotatable drum arranged in surrounding relation about said inner drum and spaced from said inner drum, said outer drum having a plurality of openings smaller than said relatively large openings of said inner drum and dimensioned to retain shellfish within said predetermined range within said outer drum, said outer drum having a first section extending a given length along the axis of said outer drum which has smaller openings therein including circular openings allowing waste shellfish of a size smaller than said predetermined range to fall out from said outer drum, and said outer drum having a second section downstream of said first section and extending a given length along the axis of said outer drum, said second section having longitudinal openings therein for allowing waste including half shells from shellfish within the predetermined range to fall out from said outer drum;
   means for rotating said shaft to rotate said inner and outer drums;
   means for receiving waste dropped through said openings of said outer drum and for removing said waste; and
   means for receiving shellfish within said predetermined range from within said outer drum at an exit end thereof.

2. A machine according to claim 1, including washing means for directing a spray of water within said inner drum.

3. A machine according to claim 2, said shaft being hollow, and said washing means including apertures formed in said shaft and means for forcing liquid thereto.

4. A machine according to claim 1, said relatively large openings being formed by a plurality of spaced bars extending longitudinally to define the peripheral surface of said inner drum.

5. A machine according to claim 4, said bars protruding variably inwardly of said inner drum to agitate the contents thereof during rotation and prevent them from sliding down the sides of the drum.

6. A machine according to claim 5, said inner drum being polygonal in section.

7. A machine according to claim 1, said machine being polygonal in section.

8. A machine according to claim 1, said longitudinal openings being formed by a plurality of spaced bars extending longitudinally to partially define the peripheral surface of said outer drum.

9. A machine according to claim 8, said bars protruding inwardly of said outer drum to agitate the contents thereof during rotation.

10. A machine according to claim 9, said outer drum being polygonal in section.

11. A machine according to claim 8, said outer drum being polygonal in section.

12. A machine according to claim 1, further including a protective shield extending over said outer drum, and means including a longitudinal rubber flap connected to the inside of said shield for loosening any shells held within the openings of said outer drum.

* * * * *